June 11, 1935.  P. H. MEYER  2,004,445
EYEGLASSES AND THE LIKE
Filed Aug. 4, 1934

INVENTOR.
Peter H. Meyer
By Parker, Brockwell & Farmer.
ATTORNEYS.

Patented June 11, 1935

2,004,445

UNITED STATES PATENT OFFICE 2,004,445

EYEGLASSES AND THE LIKE

Peter H. Meyer, Buffalo, N. Y.

Application August 4, 1934, Serial No. 738,551

5 Claims. (Cl. 88—45)

This invention relates to eyeglasses or spectacles and more particularly to improvements in eyeglasses of the type which are provided with a bridge member or lens mounting which connects the lenses and furnishes the spring pressure for retaining the eyeglasses in place on the nose of the wearer.

One object of my invention is to improve eyeglasses so as to make them of smart, attractive appearance, and at the same time insure the maintenance of the lenses in correct optical position.

Other objects of the invention are to produce a resilient bridge member or lens mounting for eyeglasses which is of simple, desirable and durable construction and effects the above mentioned advantages; and also to provide eyeglasses having the features of improvement and advantage hereinafter described and set forth in the claims.

Figure 1:
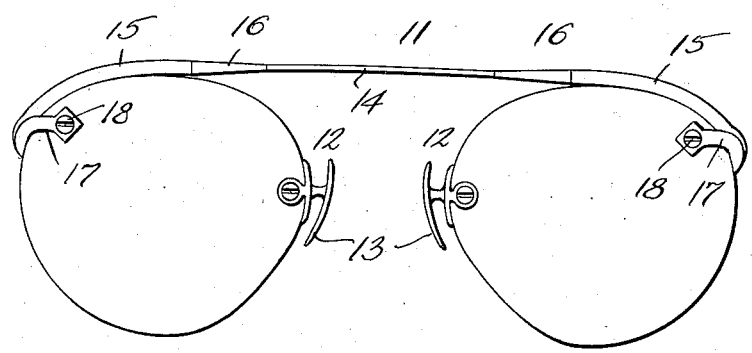
Fig. 1 is a front elevation, on an enlarged scale, of a pair of eyeglasses embodying the invention.
Figure 2:
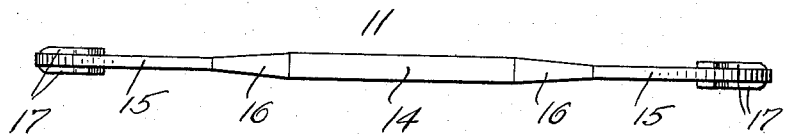
Fig. 2 is a plan view of the bridge member or lens mounting.

10 represents the lenses of the eyeglasses, 11 the bridge member or mounting which is attached to and connects the lenses, and 12 the nose pieces or fittings attached to the inner or nasal edges of the lenses and adapted to grip the nose for retaining the glasses in place on the wearer. The invention is not concerned with the construction of the nose pieces or fittings, and these may be of usual or suitable form and construction, the nose fittings shown being of known type comprising nose pads 13 adapted to bear on the nose and attached to the lenses by the usual straps which straddle the adjacent marginal portions of the lenses and are secured thereto by screws or fastenings passing through the lenses.

The bridge member or mounting 11 is attached at its opposite end portions to the lenses at the outer or temporal portions thereof, extends about the upper, outer edge portions of the lenses and bridges the space between the lenses, the bridge member being relatively flat or bowed upwardly but slightly, and extending substantially tangentially from the top central or highest portions of the upper edges of the lenses.

The bridge member is made so that the middle or intermediate portion thereof is resilient or elastic, adapting the same to spring or flex, and to provide the spring pressure which causes the nose pieces to grip the nose to retain the glasses in place on the wearer, while the end portions of the bridge member, or portions at opposite ends of the resilient middle portion, and which fit and bear against the upper, outer edge portions of the lenses, are relatively rigid or stiff so as not to flex when the resilient middle portion of the bridge member is flexed in applying and removing the glasses.

As shown, the bridge member is made in a single, integral piece with a resilient middle portion 14 which is relatively thin vertically and adapted to flex, while the opposite end portions 15 are of greater vertical depth so as to be relatively stiff or rigid and not adapted to readily flex vertically, and these stiff end portions are joined to the resilient middle portion by the tapered portions 16, which taper or merge from the relatively thin, resilient portion to the stiff or rigid portions 15. The stiff end portions 15 are shaped to conform to and bear against the upper, outer edge portions of the lenses substantially throughout the length of these stiff portions 15, and are attached to the lenses, preferably by bifurcated attaching portions 17 which extend inwardly from the extremities of the bridge member and straddle the adjacent temporal portions of the lenses to which they are secured, as by screws or fastenings passing through perforations in the lenses. The stiff portions 15 of the bridge member contact with the edges of the lenses from their outer extremities at the outer, upper portions of the lenses approximately to the highest points of the edges of the lenses, and since these portions 15 of the bridge member are relatively rigid and stationarily secured to the lenses by the fastenings 18, this bearing or contact of the stiff portions of the bridge against the edges of the lenses is substantially maintained in the use of the eyeglasses, and the flexing of the bridge member occurs substantially wholly in the resilient middle portion 14 thereof. By making the thick, stiff portions 15 of such length that they do not project inwardly substantially beyond their points of contact with the crests of the upper edges of the lenses, the leverage is reduced and there is less tendency for these stiff portions to be lifted out of contact with the lens edges in the use of the glasses, and therefore, the lenses are better retained in their correct optical positions. The stiff portions 15 preferably are not wider than the width of the edges of the lenses.

Preferably, the lenses are of the shape commonly used at the present time, having the upper portions thereof broader than the lower portions, and the upper edge portions of a flatter curvature than the lower edge portions, and the bridge member is shaped so that its stiff end portions conform with the curvature of the outer, upper edge portions of the lenses, and the bridge extends substantially tangentially from the crests of the edge portions of the lenses so that the bridge member curves or arches upwardly but slightly from its points of juncture with the lenses. This formation of the lenses and bridge member or mounting produces a smarter and more attractive appearance, and more stable connection of the lenses by the bridge member than would be obtained with circular lenses in eyeglasses in which the bridge member is attached at corresponding positions to the lenses.

I claim as my invention:

1. Eyeglasses comprising a pair of lenses, and a single-piece, combined bridge and frame member connecting the lenses, said member having a resilient middle spring portion and stiffer substantially rigid end portions which conform in shape to and extend about and bear against the upper outer peripheral edge portions of the lenses, and means for attaching said substantially rigid portions to the outer portions of the lenses.

2. Eyeglasses comprising a pair of lenses, and a bridge member connecting the lenses, said bridge member having a vertically thin resilient middle spring portion adapted to flex vertically and vertically thicker and stiffer end portions which are relatively rigid and extend about and conform in shape to the upper outer peripheral edge portions of the lenses and are fastened to the outer portions of the lenses.

3. Eyeglasses comprising a pair of lenses, and a bridge member connecting the lenses, said bridge member having a resilient approximately straight middle spring portion which is slightly bowed upwardly approximately tangential to the top central edge portions of the lenses and substantially rigid end portions which extend about and conform in shape to the upper outer peripheral edge portions of the lenses and are attached to the lenses at their temporal side portions.

4. In a device of the character described, a bridge member for connecting the lenses of an ophthalmic mounting, said member having a vertically thin resilient central spring portion which tapers outwardly towards its ends to vertically thicker relatively rigid portions which are shaped respectively to the upper and outer peripheral edge portions of the lenses, said relatively rigid portions having means adjacent their free ends for securing the said portions to the temporal sides of the lenses.

5. In a device of the character described, a single-piece integral combined frame and bridge member for connecting the lenses of an ophthalmic mounting, said member having a nearly flat resilient central portion which bows upwardly slightly and tapers outwardly towards its ends to vertically thicker relatively rigid portions which are shaped respectively to the upper and outer peripheral edge portions of the lenses, and lens strap means adjacent the outer ends of the relatively rigid portions for securing them to the temporal sides of the lenses.

PETER H. MEYER.